US006204899B1

(12) United States Patent
Hall

(10) Patent No.: US 6,204,899 B1
(45) Date of Patent: Mar. 20, 2001

(54) HIGH EFFICIENCY, COLOR CODING LIGHT PIPE METHODS FOR DISPLAY APPLICATIONS, UTILIZING CHIRAL LIQUID CRYSTAL MATERIALS

(76) Inventor: Dennis R. Hall, 7075 SW. Hoodview Pl., Beaverton, OR (US) 97008

( * ) Notice: Subject to any disclaimer, the term of this patent is extended or adjusted under 35 U.S.C. 154(b) by 0 days.

(21) Appl. No.: 09/137,880

(22) Filed: Aug. 20, 1998

Related U.S. Application Data

(63) Continuation-in-part of application No. 08/633,363, filed on Apr. 16, 1996, now abandoned.

(51) Int. Cl.[7] .............................. G02F 1/13; G02F 1/1335
(52) U.S. Cl. .................................. 349/65; 349/97; 349/98; 349/106; 349/115; 349/176; 359/465; 396/326
(58) Field of Search ....................... 349/65, 97, 115, 349/98, 106, 176; 359/465; 396/326

(56) References Cited

U.S. PATENT DOCUMENTS

| 3,679,190 | 7/1972 | Adams et al. | 350/157 |
|---|---|---|---|
| 4,566,758 | 1/1986 | Bos | 350/346 |
| 4,917,465 | 4/1990 | Conner et al. | 350/335 |
| 4,924,356 | 5/1990 | French et al. | 359/444 |
| 4,966,441 | 10/1990 | Conner | 350/335 |
| 5,029,986 | 7/1991 | De Vaan | 4/64 |
| 5,050,961 | * 9/1991 | Venolia | 359/465 |
| 5,050,965 | 9/1991 | Conner et al. | 359/53 |
| 5,122,890 | 6/1992 | Makow | 349/97 |
| 5,124,818 | 6/1992 | Conner et al. | 359/53 |
| 5,221,982 | 6/1993 | Faris | 349/115 |
| 5,398,131 | 3/1995 | Hall et al. | 359/465 |
| 5,457,554 | 10/1995 | Fairs | 349/176 |
| 5,555,114 | 9/1996 | Narita et al. | 349/97 |
| 5,835,166 | * 11/1998 | Hall et al. | 349/15 |

FOREIGN PATENT DOCUMENTS 61-128203   6/1986   (JP) .

OTHER PUBLICATIONS

Schadt & Funfschilling, 1990 JPN. J. Appl. Phys., vol. 29, No. 10, pp. 1974–1984, "New Lliquid Crystal Polarized Color Protection Principle".
Maurer, SID 90 Digest, 1990, pp. 110–113, "Polarizing Color Filters Made From Cholesteric LC–Silicones".
U.S. application No. 08/314,142, Hall, filed Sep. 1994.
U.S. application No. 08/617,075, Hall, filed Mar. 1996.

* cited by examiner

Primary Examiner—William L. Sikes
Assistant Examiner—Julie Ngo
(74) Attorney, Agent, or Firm—Smith-Hill and Bedell

(57) ABSTRACT

The invention teaches methods whereby the lighting efficiency of many lighted displays, including liquid Crystal Displays (LCDs) are increased by an order of magnitude through the use of chiral nematic liquid crystal materials incorporated into the light pipes of the displays. The light pipe technology also enables a practical embodiment of the stereoscopic display of Venolia. These methods are also applied to the fabrication of lighted signs for advertising and status indicators in hostile environments. The technology of the light pipes is also applied to the creation of a novel art medium.

3 Claims, 13 Drawing Sheets

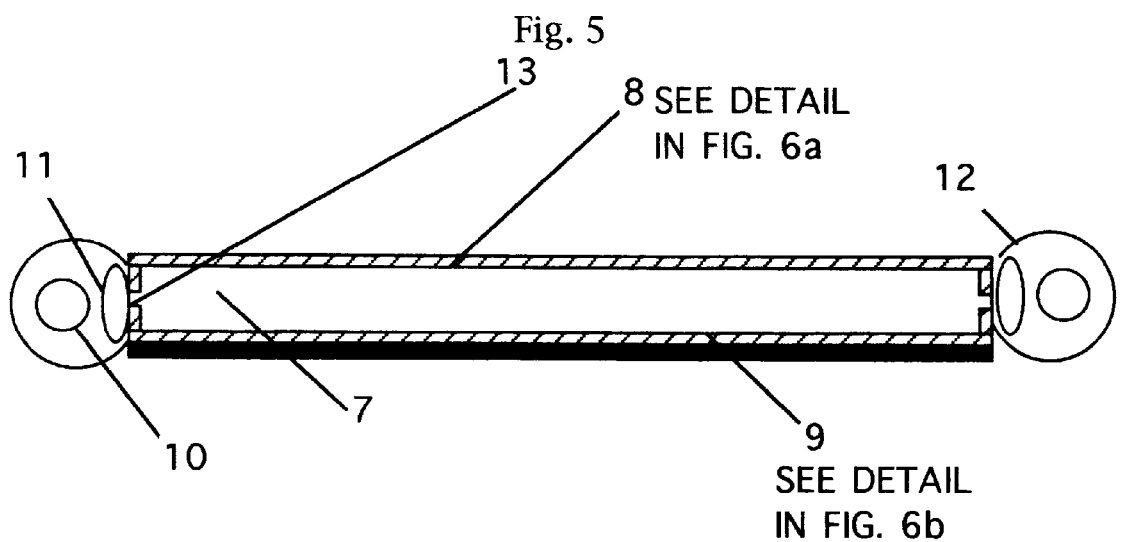
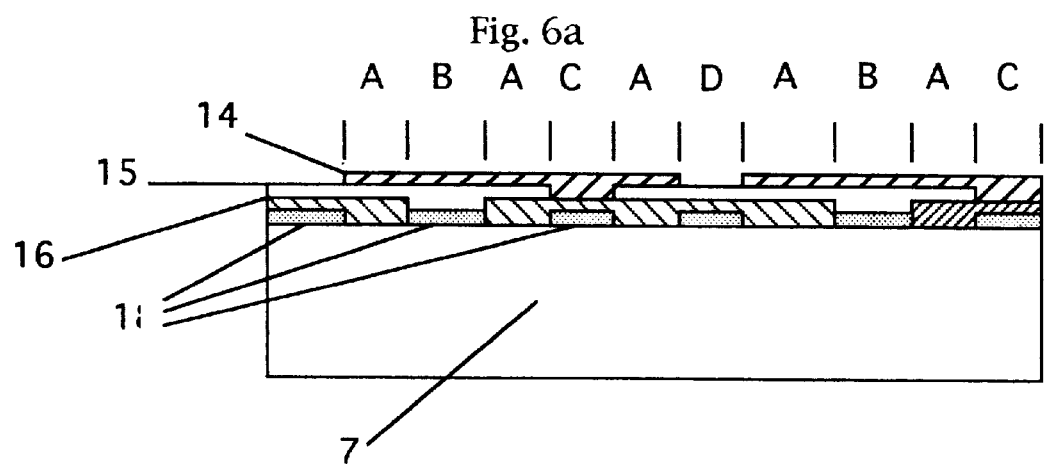
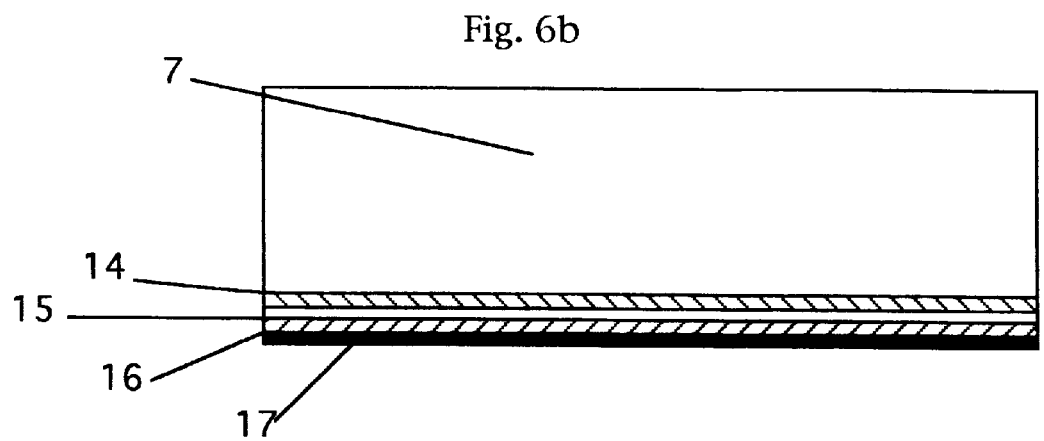

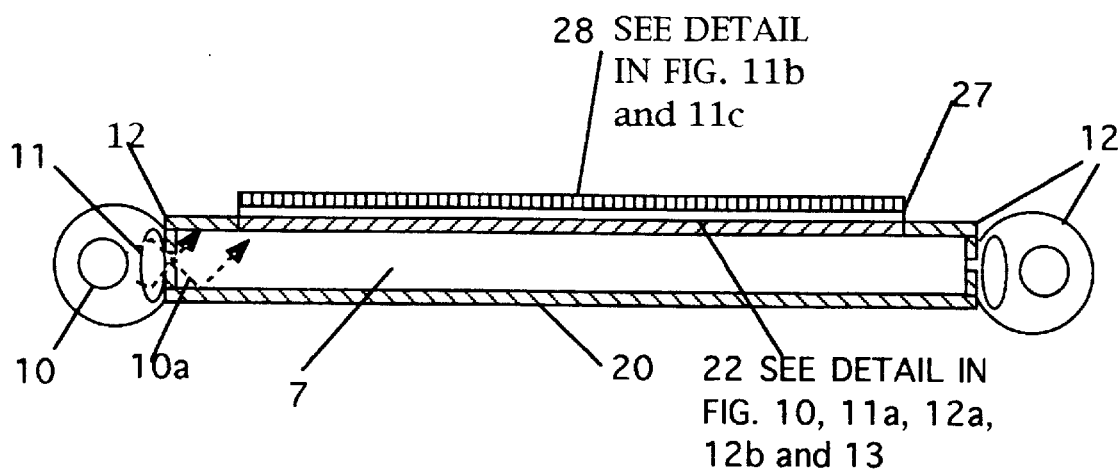
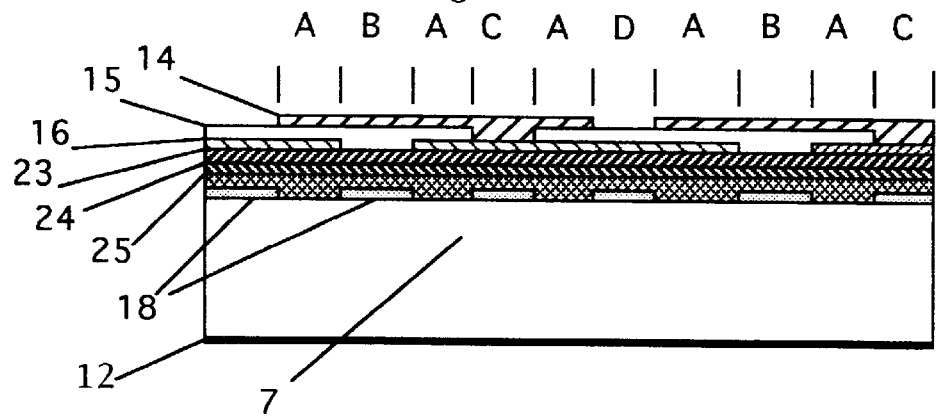

Fig. 16
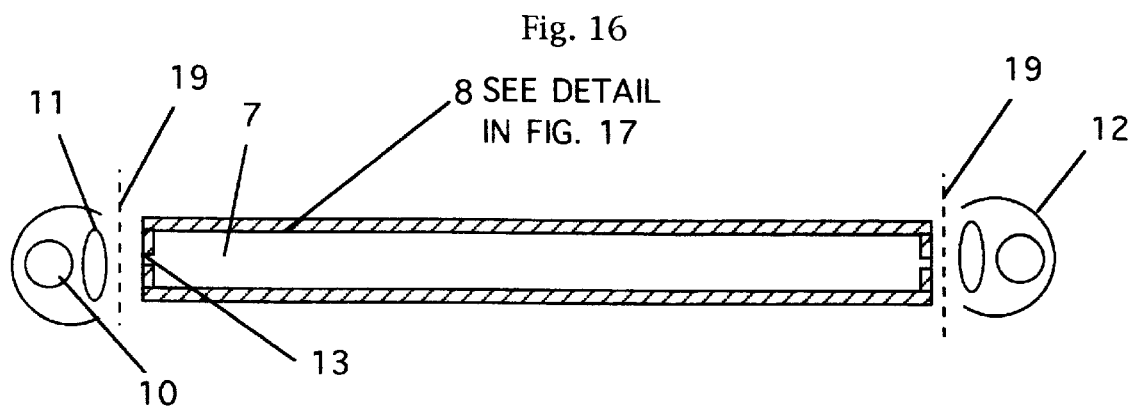
Fig. 17
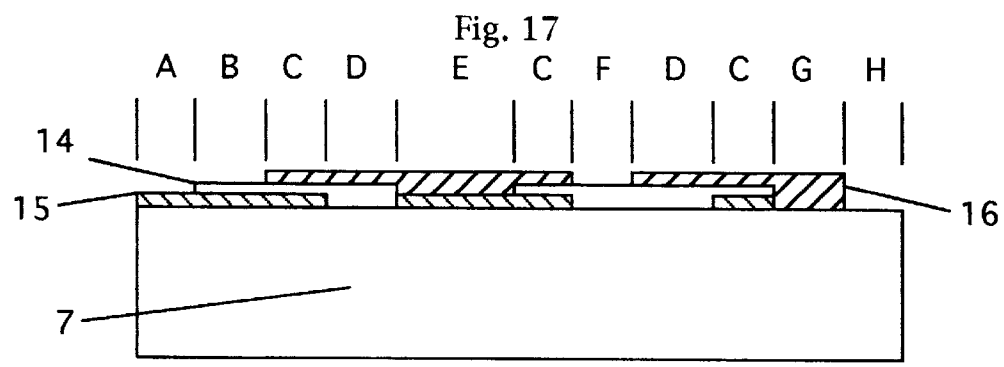
Fig. 18
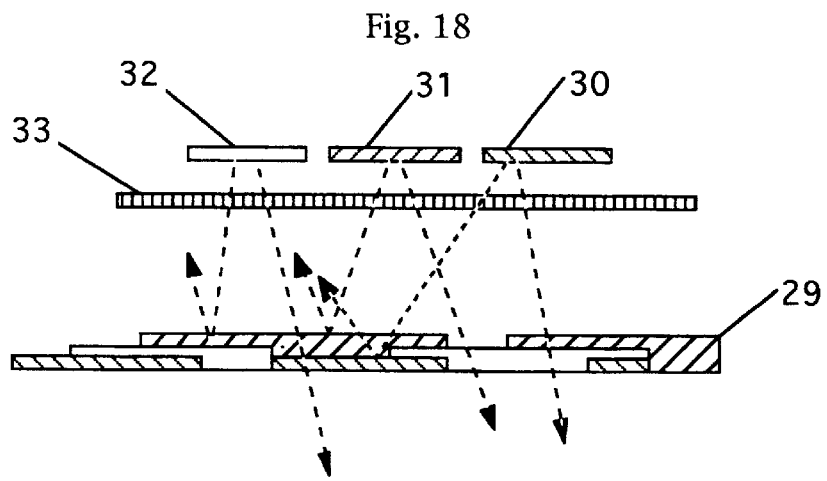
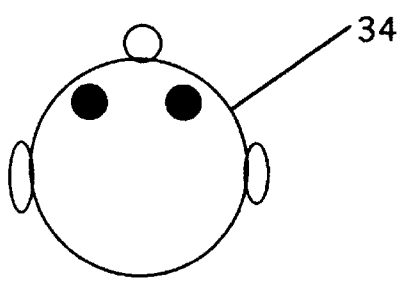

HIGH EFFICIENCY, COLOR CODING LIGHT PIPE METHODS FOR DISPLAY APPLICATIONS, UTILIZING CHIRAL LIQUID CRYSTAL MATERIALS

This application is a continuation in part of U.S. patent application Ser. No. 08/633,363 filed Apr. 16, 1996, now abandoned.

BACKGROUND

1. Field of the Invention

This invention relates to high efficiency lighted displays, including Liquid Crystal Display (LCD) panels and inexpensive lighted signs for advertising. Embodiments that are suitable as status indicators in hostile environments such as automotive and aviation are also taught. The invention also teaches the methods of a novel art medium. This application is related to Disclosure Document 376495 filed in the Patent and Trademark Office on May 18, 1995. The contents of Disclosure Document 376495 are hereby incorporated by reference herein.

2. Description of the Related Art

Light source efficiency is a very important parameter in the design of many LC Display devices. This efficiency is the primary determining factor in the time required between recharging periods for a battery of a given size. These devices include lap-top personal computers as well as many metering and indicating devices. The low efficiency of the light source of these devices results in increased size, weight and expense of the units. Thus, much work has been done on increasing the efficiency of the light sources and the piping of the light to the LCD panel. Any significant increase of the efficiency of the display lighting system, while maintaining a flat or relatively thin profile, is of considerable importance.

Two primary approaches have been taken. One approach is that of the high efficiency, serpentine fluorescent lamp imbedded in a plastic light pipe. This structure is placed on the rear of the LCD, with a mirror backing the structure to reflect light toward the LCD panel. The serpentine fluorescent lamps of this structure are expensive, but the improved efficiency, with its associated benefits are often judged to be of sufficient importance to make the expense worthwhile. A second and more popular approach, uses small, linear fluorescent light bulbs, mounted on one or two edges of the display. The light from the bulbs is "light piped" through a thick plastic light pipe across the rear of the LCD panel, where light emanating from the light pipe illuminates the rear of the LCD panel. This structure is also backed with a mirror to improve efficiency and the back sides of the bulbs will usually have reflectors to collect and direct wayward light to the light pipe.

Both of these systems flood the rear of the LCD with white light, which is then polarized, wherein about 60% of the light is lost. The polarized light entering the rear of the panel, is further apertured by a inactive area surrounding each cell (sub-pixel element) of the LCD. For a color display the light arriving at each cell must pass through a color filtering element, which further reduces the light by two thirds. The net result is that a maximum of about 7% of the light passing out of the light pipe to the display, will pass through a cell to a possible viewer. Further, if the LCD is of the active addressing type, then the instantaneous efficiency is further reduced by about one half to less than 4%.

The display technology of lighted signs and most instrumentation displays is well known. Back-lighted signs fall into two classes: The neon sign, which should require no explanation; and the back-lighted translucent sign, which is equally familiar. Instrumentation displays are similarly familiar. The most common instrumentation display is the analog meter movement, which requires no explanation. Similarly simple and common is the back-lighted panel, wherein specific indicators are switched "on" by activating a light source to illuminate a translucent display window of the indicator. These display means are generally inefficient and limited to a single function, which requires a number of such displays to produce the desired communication.

Additionally, light emitting artwork, usually found in the rendering of religious scenes, has generally used the same technology as that of the back-lighted sign or the stain-glass window.

The poor efficiency of the light pipes of the prior art is greatly improved by the methods of the present invention, wherein virtually all the light passing out of the light pipe, can pass through the LCD cells to the viewer. The novel light pipe is also considerably thinner than the existing designs. The new design appears to eliminate a number of process steps in the fabrication of a LCD panel, as well. The methods of this invention also promise a new dimension of lighted artwork in the home and place of business.

The invention utilizes many optical properties of Cholestric Liquid Crystals, more recently known as Chiral Liquid Crystal (CLC) or Chiral Nematic liquid Crystal (CN-LC) materials. The materials were invented by Adams et al, U.S. Pat. No. 3,679,290 and refined by Schadt & Funfschilling and Maurer, c.f. Schadt & Funfschilling, 1990 Jpn. J. Appl. Phys., vol. 29, No. 10, pp 1974–1984, New liquid Crystal Polarized Color Projection Principle, and Maurer, SID 90 Digest, 1990, pp 110–113, Polarizing Color Filters Made From Cholesteric LC-Silicones. These materials have the optical property that depending upon the direction and rate of twist (pitch) of the molecules in the LC structure, will reflect one color and handedness of substantially Circularly Polarized light (CPL), while transmitting all other colors and handednesses of the incident light. In this way the light may subsequently interact with other species of the Liquid Crystal (LC), i.e. those having different reflective color and/or handedness. Thus, these materials, when properly deposited form spectral CLC filter/mirrors, which can be deposited in series, even upon each other, following the teachings of Maurer. In so doing, the filter/mirrors can reflect a broad spectrum of light, ranging from within the Infra Red region, well into the Ultra Violet spectrum following the teachings of Adams et al.

The color of the light reflected is related to the pitch of the LC structure, where the center wavelength color of the light reflected corresponds to that color having a average wavelength equal to the pitch of the LC structure, using the average propagation velocity in the LC to calculate that wavelength. The handedness of the reflected CPL corresponds to the direction of the twist in the LC structure. The spectral distribution of the reflected CPL is related to the birefringence of the LC structure. The reflected light at the center wavelength of the spectral distribution is near perfectly circularly polarized, while other wavelengths in the distribution are slightly elliptically polarized, with the degree of ellipticity increasing toward the edges of the distribution.

Adams states in patent, U.S. Pat. No. 3,679,290, that the CLC films will reflect virtually 100% of the light of one handedness and color of Circularly Polarized Light (CPL), with the absorption of the light by the CLC films usually being negligible. In the present application this property is very important, since each ray of light will experience multiple reflections from the CLC films. Such data that is available on the reflection of CPL from CLC films, suggests that the reflection efficiency of about 99% is equal to or greater than the best specular reflectors. Adams also states in the same patent, that the thickness of the individual film layers are preferably between 0.5 to 20 microns and the ideal film thickness is 3 to 10 microns.

FIG. 1 illustrates the reflective characteristics of three species of CLC filter/mirror materials to unpolarized light. If the light is circularly polarized and of an orientation which is reflected by the filter/mirror materials, then virtually all the CPL is reflected. These CLC filter/mirror materials can be deposited one upon the other to reflect the entire visible spectrum or any portion of the spectrum in one or both polarization orientations. Using only two of the filter/mirrors and polarized light of one handedness, a portion of the spectrum is transmitted through the CLC filter/mirror layers, as is illustrated in FIG. 2. In this illustration much of the light reflected by filter/mirror 2 is transmitted by the two CLC filter/mirror (layers) of FIG. 2.

FIG. 3 illustrates the normalized spectral distributions of the phosphors of a fluorescent light source (bulb) used to backlight a LCD or a sign of the invention. This is typical of bulbs used to backlight most LCD displays. As illustrated the bulb has three phosphors, producing light in three primary colors 4, 5 & 6. The light is judged by the viewer to be white light, although it lacks any continuity in spectral distribution. This is because the light stimulates the three color receptors (cones) of the human eye. The three peaks of the spectral distributions are judged to be blue 4, green 5 and red 6.

SUMMARY OF THE INVENTION

In the devices of the invention, the emission from the phosphors of FIG. 3, in whole 4 & 6 or in part 5 are reflected and transmitted by the CLC filter/mirrors of FIG. 2. The specific colors of Red, Green and Blue (R, G & B), are reflected and transmitted by the CLC filter/mirrors 1 & 3. FIG. 4 illustrates the spectral match between the colors of a fluorescent LCD backlight and the ability of a set of CLC filter/mirrors of two species (two layers) to block two colors 4 & 6 and transmit the desired portion of a third color 5.

FIG. 5 summarizes the invention and illustrates the feature all embodiments of the invention have in common. In FIG. 5, a sheet of glass or other transparent, non-birefringent medium 7 has CLC filter/mirror layers 8 and 9 deposited upon its plane surfaces. In this embodiment, light from a light source, shown as a fluorescent bulb 10 is directed through a narrow gap or port in the CLC filter/mirror layers 8 and 9, by an optional condensing lens 11. A specular reflector 12, commonly used in these applications is also shown. Aside from collecting as much light as possible, another function of the condensing lens 11, is to impart a large angular dispersion to the light injected into the transparent medium 7. The injected light will be reflected many times between the inner faces of the transparent medium 7. The angular distribution of the injected light can be redistributed to aid "on-axis" viewing by providing a diffusing surface at the injection port 13 or on portions of the reflection surfaces of the medium 7. These surfaces are made reflective by the application CLC filter/mirrors 8 and 9 applied to the plane surfaces of the medium 7. When three layers of the CLC material are applied, as illustrated in FIGS. 6, with the layers 14, 15 & 16 reflecting specific colors of a single handedness, the light pipe also becomes a circular polarizer. This results from the fact that the handedness of light, not reflected by the CLC filter/mirror layers 14, 15 & 16 passes out of the medium 7, where it can be absorbed. Such a light absorber is shown as layer 17 in FIG. 6b and similar absorbers can be placed in selected areas of the other surface of the medium as well. If the light pipe of this case, extends beyond the LCD display area, that extended area of the light pipe can also utilize a light absorbing layer 17. The light absorber is somewhat optional, since the undesired species of light will be transmitted out of the medium. However, without the absorber, there is the possibility that after multiple reflections, light having the undesired polarization, could enter the medium again, to reduce the contrast of the display. FIG. 6a also shows the electrodes 18 of the LCD, wherein transparent electrodes (usually indium tin oxide) are applied to both faces of a LCD. Since it is not practical to place such electrodes upon the CLC layers, the electrodes are placed directly upon the medium 7. This then places the CLC layers within the LCD in this embodiment.

In the illustration of FIG. 6a, one sees that the CLC films are three layers thick in area "A" as they also are on the rear surface of the medium, illustrated in FIG. 6b. But in the areas "B, C & D" of FIG. 6a, there are only two CLC film thicknesses in each area, with a different combination of CLC films existing in each area. With only two CLC films, one color of the Circularly Polarized Light (CPL) will not be reflected back into the medium. This color of the light is transmitted out of the medium and into a polarization modulation cell of the LCD, through a color sub-pixel window (B, C or D). These windows form color elements or sub-pixels of the LCD. The three layer structure of the "A" areas, reflect all the light of the desired handedness and thus mask the dead areas between LCD cells or color sub-pixels of the LCD. This reflection then preserves the light that is normally lost in an absorbing mask normally placed over these dead areas. Similarly, the light not transmitted by a color sub-pixel window (area B, C or D) is reflected back into the medium, where it can be further reflected until it passes through a color sub-pixel window, transmitting its color and handedness of CPL. This then greatly increases the brightness and efficiency of a LCD.

BRIEF DESCRIPTION OF THE DRAWINGS

FIG. 5 illustrates one possible configuration of the light pipes of this invention.

FIG. 6a illustrates the deposition of CLC mirror layers on the LCD side of the light pipe of FIG. 5.

FIG. 6b illustrates the deposition of CLC mirror layers and a light absorber on the backside of the light pipe of FIG. 5.

FIG. 9 illustrates a highly efficient embodiment of the invention in combination with a LCD.

FIG. 10 illustrates one CLC polarization encoding method for the light pipe of FIG. 9.

FIG. 16 illustrates a simple lighted sign arrangement utilizing the methods of this invention.

FIG. 17 illustrates the application of artwork to the surface of the sign.

FIG. 18 illustrates a design of a multi-message sign or status indicator.

DESCRIPTION OF THE PREFERRED EMBODIMENTS

The ability of the CLC mirrors to efficiently reflect substantially all the light falling upon unused or dead areas of the LCD is particularly useful in a certain class of LCDs. These are active matrix LCDs, which have a switching element, usually a diode or a This Film Transistor (TFT) in every cell. These transistors are usually located on the rear surface (backplate) of the LCD, but they can be relocated on the front surface (faceplate) of the LCD, in order to accommodate the light pipes of the invention. Concerns that relocating the TFT on the faceplate will reduce the contrast of the display by increasing the reflected ambient or room light from the LCD are unfounded. The LCDs of the invention modulate CPL and as such they have a circularly polarizing filter on the output (exit) of the display. Most often this filter will be of the type that absorbs the undesired polarization orientation. Then, the ambient light incident upon the TFTs of the LCD, the light is circularly polarized and when reflected from the specular surface of the TFT, the handedness of the CPL is changed. Thus, substantially all the ambient light reflected by the TFTs is absorbed by the exit circular polarizer. An undesirable aspect of the TFT is the fact that they block a large percentage of the light of each cell and thus greatly reduce the brightness and efficiency of the display. However, with the light pipes of the invention, the light normally absorbed by the TFT can be reflected back into the medium, by having the third CLC film extended into the portion of the cell reserved for the TFT. In doing this, there is an additional benefit resulting from the masking of the TFT and this is a reduction of light source induced photo conduction in the TFT.

Figure 7:
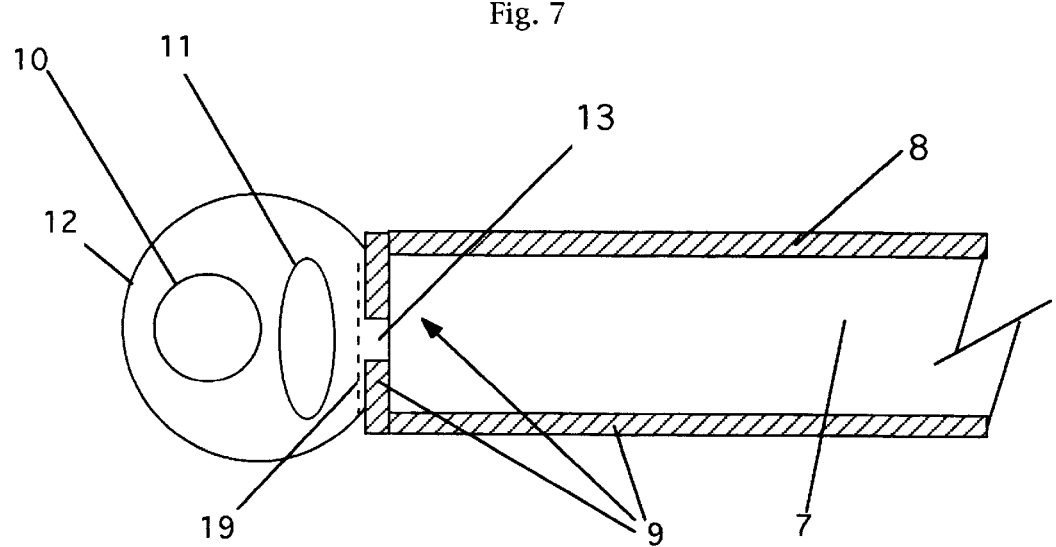
FIG. 7 illustrates the common light source as applied to the light pipes of the present invention.
Figure 8:
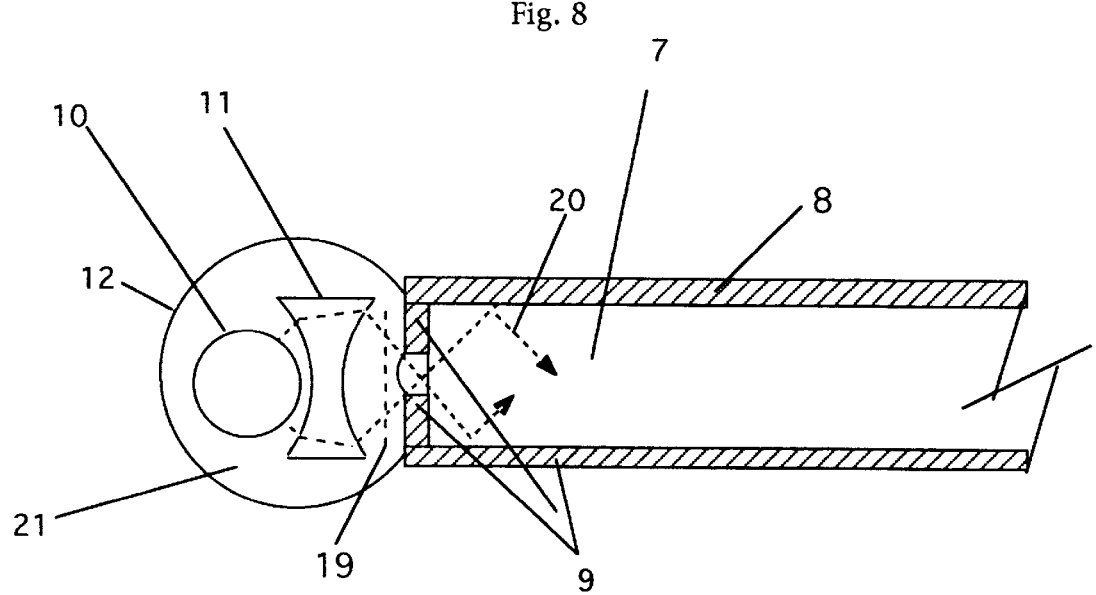
FIG. 8 illustrates a more efficient arrangement of injecting light into the light pipe structure.

FIG. 7 illustrates the common light source as applied to the light pipes of the present inventions. Note that the CLC filter/mirror layers 8 & 9 extend around the end of the light pipe and present only a small gap or port 13 through which light from the source 10 is directed by the condenser lens 11. The port is made as narrow as possible to minimize light escaping from the light pipe. FIG. 7 and also FIG. 8 shows an optional polarizer 19 which polarizes the light to the desired state of CPL before the light 20 is injected into the light pipe. While this polarizer 19 and the injection port in the CLC filter/mirror coatings are shown at the remote ends of the light pipe in many of the drawing figures, this is not a necessary condition. The injection of light can be made at any unoccupied area of the medium 7, as will be illustrated, in the treatment of light pipe signs. FIG. 8 illustrates an equivalent, but somewhat more efficient arrangement of injecting light into the light pipe structure. While this is not the subject of the invention, it illustrates possible efficiency improvements resulting from an immersion light condensing system, wherein the light source 10 and the condensing lens 11 are immersed in a high index of refraction fluid 21. This allows the use of an "air filled" or other low index of refraction condensing lens 11 to direct the light to the injection port 13. The whole idea of using lenses of these types, appears misdirected, since no imaging of the light source is involved. In the case at hand, non image forming ray direction is far more efficient. This is the technique of the Fresnel Lens and the methods used in "modern" Light Houses, were an array of prisms bend and direct the light from the source, through a number of prisms, to and through the port 13. By these means, virtually all the light from the source can be injected into the light pipe medium 7. However, structures of this complexity are expensive, making the resulting efficiency improvement impractical in most applications. Greater efficiency improvements can be obtained with no increased expense by the methods of the invention.

The first embodiment of this invention is estimated to increase the efficiency or brightness of the LCD display nearly ten times, depending upon the type of LCD. But, a second embodiment of the invention, will increase the efficiency of the light pipe system by fifteen times. This embodiment is illustrated in FIG. 9, wherein unpolarized light is injected into the medium 7, so that the optional polarizer 19 is absent from the structure. The back side and part of the front side coating on medium 7 is a specular reflector 12, (a common mirror). The significant difference of reflections of CPL from the CLC filter/mirrors and a common mirror, is that reflection of CPL from the CLC filter/mirror does not change the handedness of the light being reflected, whereas a specular reflector does change the handedness of reflected CPL. With this in mind, the unpolarized light 10a is injected into the medium 7 of FIG. 9 where it is reflected between the two faces of the medium.

Figure 12A:
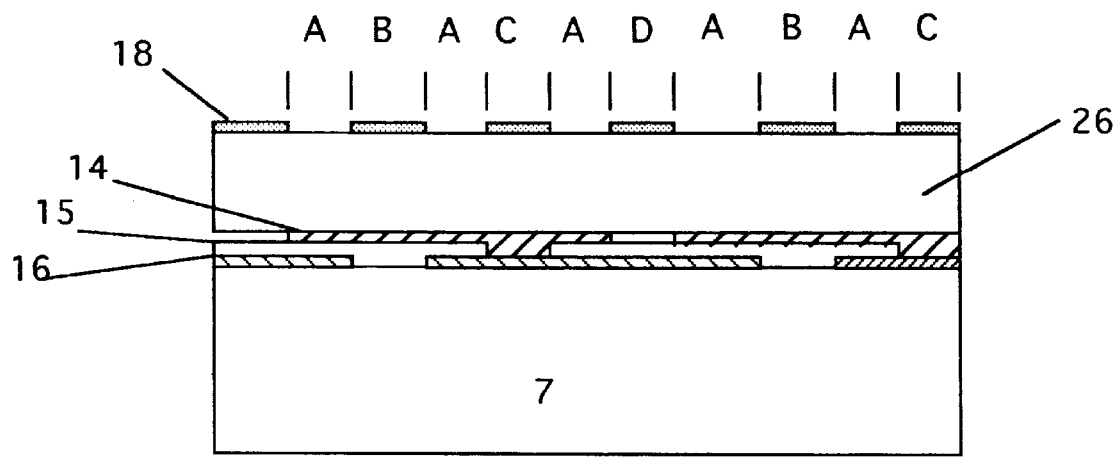
FIG. 12a illustrates a CLC coating detail wherein a three layer CLC coating provides polarization and color selection windows on a non-birefringent medium adjacent to the back plate of a LCD.
Figure 12B:
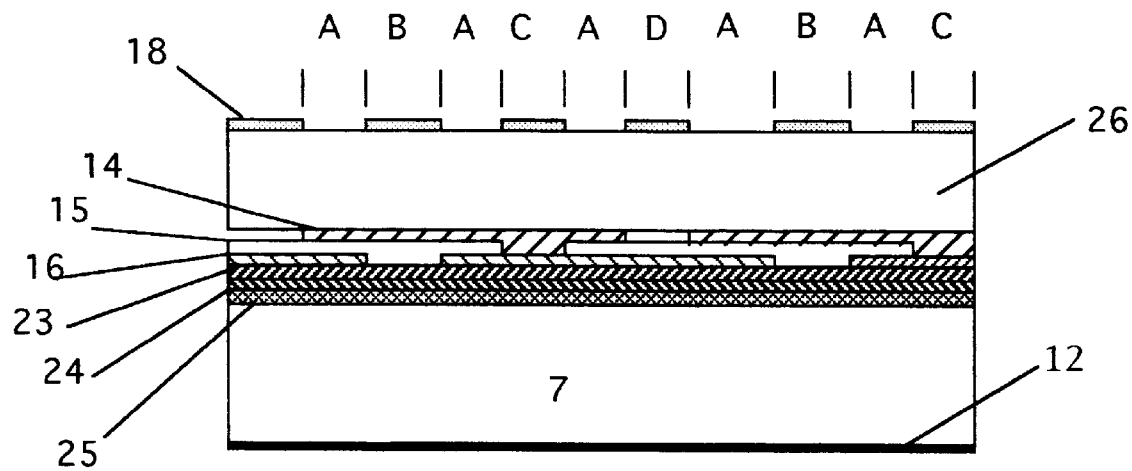
FIG. 12b illustrates the above with the addition of three additional CLC coatings.
Figure 13:
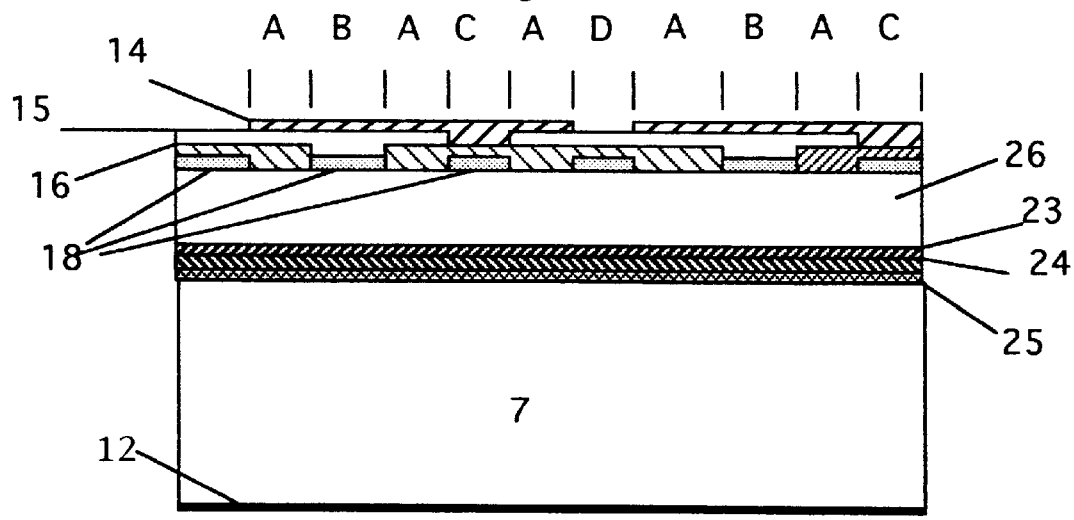
FIG. 13 illustrates CLC coating detail for the above light pipe.

In the area of the LCD display, the structure is configured as shown in FIG. 10,12b or 13. In FIG. 10, three more CLC filter/mirror layers 23, 24 & 25 have been added. These are CLC filter/mirrors that reflect the handedness of CPL, which is orthogonal to that being used by the LCD. The unpolarized light 10a encounters these CLC filter/mirrors which reflect the undesired orientation of CPL, while transmitting the desired orientation of the light, to the CLC filter/mirrors as described earlier. Then, some of the light falling upon the color sub-pixel windows in the filter/mirrors will be transmitted through a cell of the LCD. The light not so transmitted is reflected back into the medium, passing through the CLC filter/mirror layers 23, 24 & 25 and crossing the medium 7 to reach the rear surface of the light pipe. Wherein, substantially all the light is reflected from the specular reflector 12, having its handedness reversed. The light then travels across the medium to encounter the CLC filter/mirror structures, whereupon some of the light of the desired polarization orientation is transmitted through the color sub-pixel windows into the cells of the LCD, with the remainder of the light being returned to the mirror 12. If the specular reflector and the CLC filter/mirrors were perfectly efficient reflectors, all the light injected into the light pipe would be selectively transmitted in the desired color sub-pixel cells of the LCD. But with the practical limitations of the mirrors, the gains are more modest.

Figure 11A:
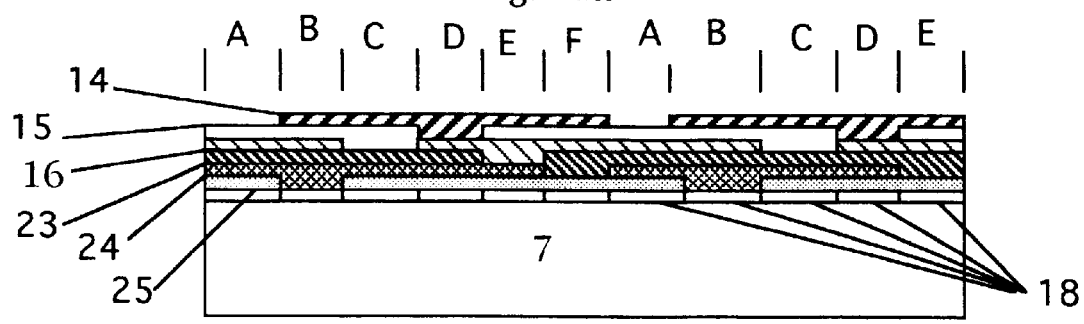
FIG. 11a illustrates a configuration of CLC polarization encoding of the LCD backplate (7) which provides a stereoscopic display when used with the faceplate CLC polarization analyzing configuration illustrated in FIG. 11b.
Figure 11B:
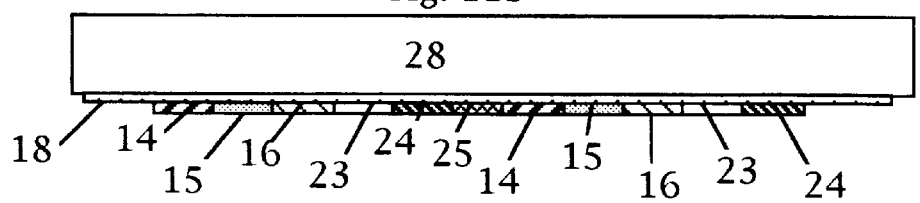
FIG. 11b illustrates the configuration of CLC layers with windows deposited upon the LCD faceplate (28) with switching electrodes (18) for the purpose of creating an outside analyzing polarizer of the LCD of FIG. 9, suitable for providing a stereoscopic display.
Figure 11C:
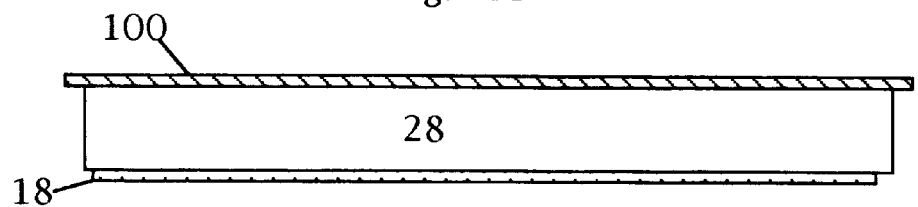
FIG. 11c illustrates the common LCD faceplate arrangement with the outside polarizer (100) and the outside switching electrodes (18).

Using the type of structure illustrated in FIG. 10, color sub-pixel windows can be configured to transmit light of any color in either handedness of CPL. The letters (A through D) designate four states of the input polarizer 22. The "A" state inputs no light, while states "B through D" represent the states of three species of light. A species of light is designated by a color and polarization orientation. If a LCD can be configured with these many CLC layers 14 to 16 and 23 to 25 inside the switched cells of the LCD, then a full color stereoscopic display is possible by the methods of this invention. This method can be illustrate in FIG. 9, when the light pipe polarization encoding detail 22 is configured in stripes or other area elements according to the teachings of Venolia, U.S. Pat. No. 5,050,961 or Hall, U.S. patent application Ser. Nos. 08/314,142 and 08/617,075 and illustrated in FIG. 11a. The letters (A through F) designate six species of light, produced by the lightpipe. These species are in three colors and two polarization orientations. The light passing from the medium 7, is encoded in orthogonally polarized sets and injected into the LCD cells. The LCD cells polarization modulate the color fields of a pair of stereoscopic images, within the polarization sets. The analyzer which is an intensity modulating outside polarizer, shown on the faceplate 28 in FIG. 9 and illustrated in FIG. 11b. Since the CLC outside polarizer at each cell is required to intensity modulate only one species of CPL, this element can be configured very simply. It is thus comprised of the color and polarization encoding CLC material that is absent from the window areas of the input polarizer 22. Such an output polarizer is illustrated in FIG. 11b. This stereoscopic display is presented to a viewer, wearing polarization decoding glasses. The lenses of these glasses transmit to each eye only the image of the pair of stereoscopic images intended for each individual eye. In this instance, several variations can be made between the LCD input and output CLC masks. An input mask need only produce one polarization handedness for all colors, with the switching logic being reversed between the two sets of area elements. However, the output mask must be configured as illustrated in FIG. 11b, having filters of both polarization orientations for each color, with the orthogonal polarization orientations for each color being in the separate sets of pictorially encoded area elements. FIG. 11c is illustrative of the LCD faceplate 28 for the monoscopic displays of this invention. It is the configuration commonly used in LCDs. The faceplate 28 has an intensity modulating analyzer (100) on its output side and the switching electrodes (18) of the LCD on its inner surface.

One thing the drawings do not properly illustrate is the scale of the features of the invention. The horizontal features are compressed by a factor of over ten times, relative to the vertical features, so that it appears in the drawings that the many CLC filter/mirror layers are quite thick relative to the size of the LCD cells, which is not the case. However, these layers do become rather thick relative to the thickness of the LC in the cells of the LCD. It is of some concern that the LCD switching electrodes 18 will be desensitized to a large degree, by having much of the gap between the two sets of LCD electrodes increased by the thickness of the CLC filter/mirror layers 14, 15, 16, 23, 24 & 25. This situation can be alleviated by the method illustrated in FIGS. 12a and 12b. In these embodiments, the display's rear switching electrodes 18 are placed upon the display's back plate 26. This being the normal configuration for many displays, including LCDs. However, in these cases the back plate 26 has been made as thin as possible (Corning micro-sheet) and it 26 is bonded to the CLC filter/mirror layers, deposited upon a non-birefringent medium 7. This solution may not be totally satisfactory, because of parallax errors allowing the light to enter portions of the LCD array, where it is not desired. FIG. 12a illustrates the three CLC layers providing polarization and color selecting windows for light to be passed into the display device. FIG. 12b includes the entire CLC structure of FIG. 10 at the interface between the display's back plate 26 and the non-birefringent medium 7.

Figure 14:
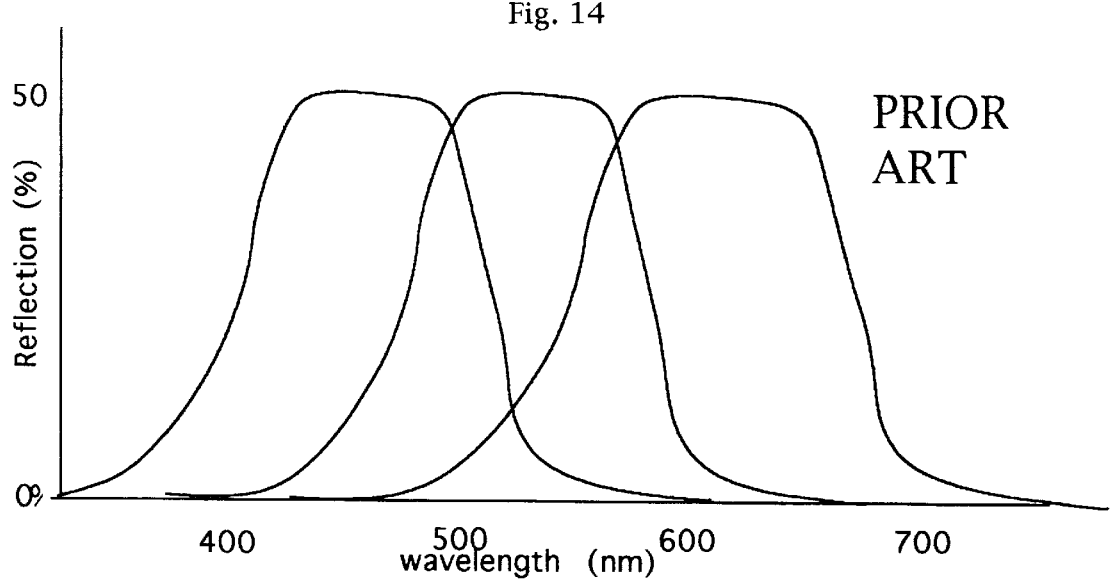
FIG. 14 illustrates merging of broad band spectral distributions of three coextensive CLC filter/mirror layers.
Figure 15:
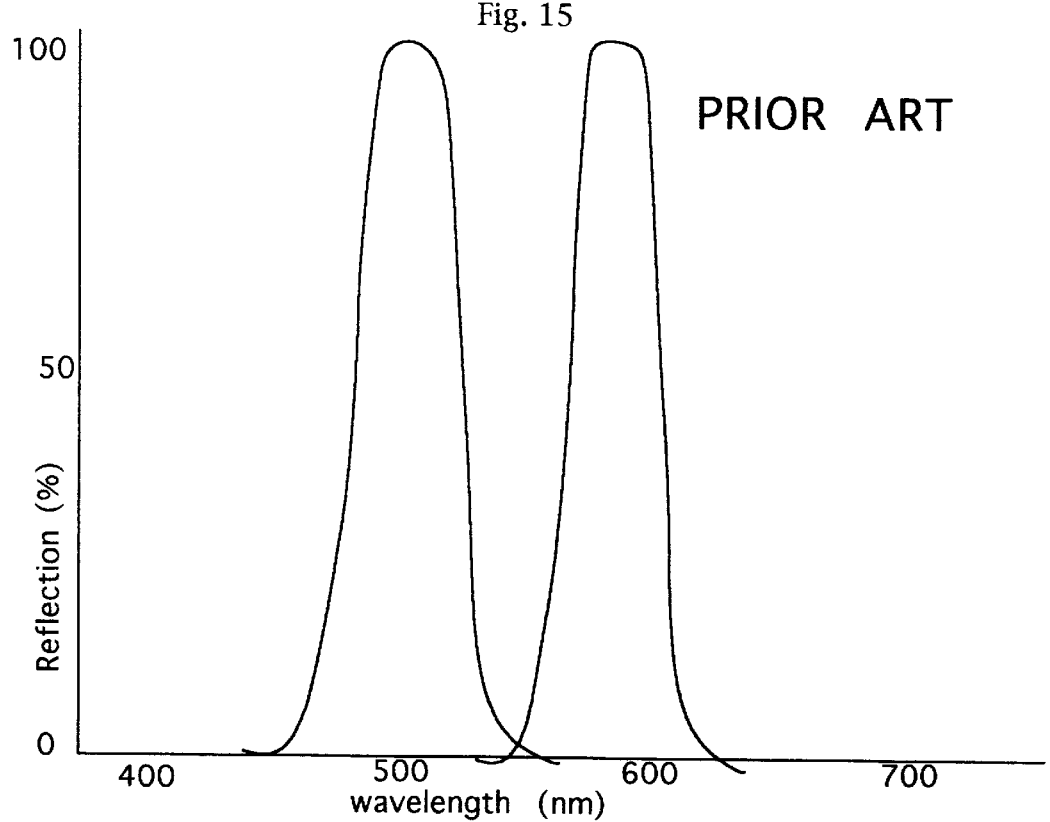
FIG. 15 illustrates the spectral distribution of notch filters to be used with the CLC filter/mirrors of this invention.

FIG. 13 illustrates a compromise, wherein the CLC filter/mirrors 14, 15 & 16, which need to be in proximity to the LCD cells, being deposited upon the LCD switching electrodes 18. The CLC filter/mirror layers that are merely returning the light of the undesired polarization orientation are placed somewhat remotely to the LCD cells. This is done by placing a sheet of very thin glass between the two sets of CLC filter/mirrors. The CLC filter/mirrors, reflecting the undesired handedness of CPL 22, 23 & 24 might be made to reflect a broader range of colors, because there is a slight effect regarding the angle with which the light is incident upon the CLC filter/mirrors and thus, to insure that all the light of the undesired handedness is reflected, CLC filter/mirrors having a broader spectral distribution may be warranted. As noted earlier, this is done by using a CLC material having a large amount of birefringence. The spectral distributions of such materials is illustrated in FIG. 14. It may also be desirable to incorporate "CLC notch filters" that reflect both handednesses of light in the spectral region between the primary color peaks of the color and polarization controlling filters 14, 15 & 16, as illustrated in FIG. 15. If a "white" light source 10 is used, "CLC notch filters" should be placed at the light source, as where the optional polarizers 19 in FIGS. 7 & 8 are located. These then will narrow the spectral distributions of the individual colors to better match the spectral distributions of the CLC color and polarization controlling filters 14, 15 & 16. While the use of the "CLC notch filters" will reduce the brightness somewhat, the contrast and color gamut will be increased.

The methods of the invention can be applied to the creation of lighted signs and multi-function instrumentation displays or indicators. In its simplest form, signs and other displays can be created upon a sheet of annealed glass, wherein the surfaces of the glass sheet are coated with CLC filter/mirror material to produce a static or dynamic display. FIG. 16 illustrates an embodiment of this technique. Elements 10, 11 & 12 produce a source of light injected into a transparent medium 7. In this embodiment, both surfaces of the medium 7 can be coated with CLC filter/mirror material which reflects one handedness of CPL. In addition a polarizer 19, transmitting that handedness is placed between the light source 10 and the medium 7. FIG. 17 illustrates some of the display options available with up to three color layers of CLC filter/mirror material of one handedness. With this arrangement, the states of "black", "white" and six colors or combination of colors are possible. In the illustration, the area "A" produces one combination of colors, such that if the top CLC filter/mirror layer 16 reflected "red" CPL of the handedness being displayed, and the second layer 14 reflected "green" CPL, then in area "A" only the "blue" light reflected by the third 15 or innermost layer would be absent and the display color would be "yellow". The color "yellow" being a combination of the "red" and the "green" light transmitted resulting from the absence of the two layers 16 and 14. Area "B" will produce a primary color, that color being "red" in the above example and area "C" will produce no light, since all three filter/mirrors 14, 15 & 16 are present in that area. Area "D" would produce another primary, this being "blue" in the example, while area "E" yields the third primary color, which is "green" in the example. Areas "F" and "G" are the remaining complimentary colors, while area "H" produces all colors, or "white" light.

The message of a sign can be changed by controlling the color and polarization of the light which falls upon the encoded display area. One of the most useful signs or status indicator is illustrated in FIG. 18. The encoded display area 29 is the same as that of FIG. 17, but the color and polarization of the light that lights the display area 29, is controlled by the light sources 30, 31 & 32. Each light source controls the display of a message in the common display area 29. In doing this, the colors of the display become limited to the primary colors. Although through a selection of narrow band CLC filter/mirrors, more layers of the CLC filter/mirrors may be used to create more switched primary color states. A primary color is defined as a color that a specific CLC filter/mirror layer reflects. In the illustration of FIG. 17, the light sources 30, 31 & 32 could be LEDs. The light from the LEDs passes through a circular polarizer 33 before falling upon the display area 29. This illustration shows a display area 29 capable of displaying three different messages in the same display area, depending upon which LED is "turned on". Many more than three messages can be displayed, by using more CLC layers, with corresponding spectrally matched light sources of both polarization orientations. These multi-message displays can be a dashboard mounted, transmission shift position indicator or an engine temperature, oil pressure or fuel supply display in an automobile. In these applications, when the status of the item being indicated and displayed is out of its normal regime, the color of the display changes to warn the viewer of a non-standard situation. Thus, an indicating pointer for the engine temperature will change from blue when the engine is cold, to green when the temperature is normal, to red when the temperature is too high. This technique can also be applied to conventional analog/digital displays, wherein the meter face or background of the display changes its color to alert a viewer to a change of situation.

Figure 19:
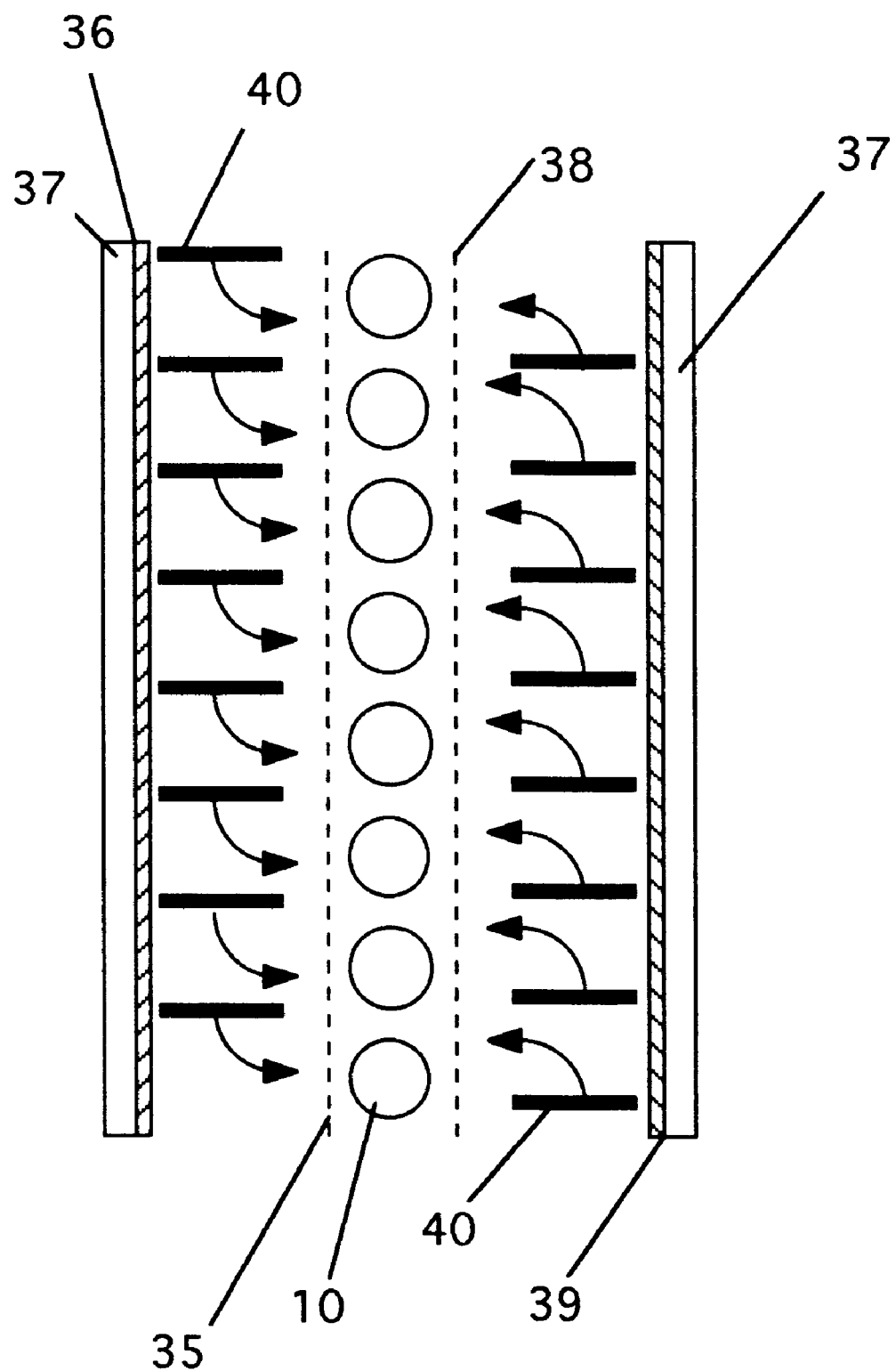
FIG. 19 illustrates a high efficiency lighted sign for viewing in low ambient light conditions in a first state or switched to a second state for viewing in high ambient light conditions.

CLC filter/mirror encoded signs are best suited for viewing in low ambient light conditions. This is because when these signs are viewed in high ambient light conditions, one handedness of the ambient light is reflected from the sign, while the other handedness of the light passes through the sign. Some improvement can be made by placing absorbing type circular polarizers over the outside surface of the sign. This will prevent light from shining through the sign and thus, improve the contrast of the display, when the two sides of the sign are encoded with orthogonally polarizing CLC filter/mirrors. However, the reflected ambient light produces a display, which is color complementary relative to the lighted display, e.g. white areas of the lighted display, become black in the reflected ambient light display; black areas become white; blue areas become yellow; red areas become cyan; green areas become magenta; yellow areas become blue, etc. When the ambient light and the interior light coming from the sign are of the same intensity, the display becomes totally white, since all elements of the sign produce white light. This is a serious shortcoming in some applications. To minimize this shortcoming, two approaches may be taken. The first being to simply make the sign light overwhelmingly bright that the ambient light level is of little significance in the spectrum of light arriving at a viewer. While this approach lacks elegance, the second approach is only slightly better. This is to turn the light within the sign "off" when the ambient light level is sufficient to illuminate the sign and even switch elements within the sign to absorb any of the ambient light that enters the sign. In this way the sign will produce the pictorial display of the sign in complementary colors relative to when the sign is lighted, but the display will not be faded toward white, as when the sign is lighted in a high ambient light environment. Such a sign is illustrated in FIG. 19, where a double sided sign having a light source 10, the spectral distribution of which matches the spectral response of the CLC filter/mirrors used in the sign, as in earlier embodiments. The unpolarized light from the source 10 travels to an internal circular polarizer of the CLC type 35. This 35 will usually be a three CLC layer filter/mirror, reflecting one handedness of CPL, while transmitting the orthogonal handedness of CPL, throughout the visible spectrum. Thus, light of the other handedness is transmitted to the CLC encoded (printed) pictorial display 36 of the sign, which is encoded with CLC material that reflects CPL of said other handedness. The pictorial display is deposited upon a non-birefringent transparent medium 37, allowing the pictorially encoded light of the other handedness to pass to a viewer. Similarly, the light going to the other side of the sign, encounters a CLC type polarizing three layer filter/mirror 38, which transmits CPL of the one handedness. This light next encounters the pictorially encoded display 39, which selectively reflects light of the one handedness, transmitting some of said light through the substrate 37 of that side, to a viewer. Thus, the light from the two sides of the sign are pictorially encoded with CPL of orthogonal handedness. This arrangement improves the efficiency of the sign, since the handedness of light that is not used on one side of the sign is directed by reflection and transmission from elements 35 and 38 to the opposite side of the sign, where it may be used. When unpolarized ambient light falls upon the sign, it passes through the substrate 37 to the CLC encoded displays 36 and 39, which reflect certain colors in one polarization orientation of CPL, creating the display of the sign. The polarization orientation is different between the two sides of the sign, but this has no significance to most viewers. All the light not reflected by the CLC displays 36 and 39 is transmitted to the interior of the sign. In the high ambient viewing mode the light of the sign is turned "off" and the shutters 40 within the sign are shut to absorb the transmitted ambient light incident upon them, so that none of this light will be redirected back to the CLC encoded displays 36 and 39 to degrade the display. In FIG. 19 the closure of the shutters 40 are indicated by the arrows indicating the direction of rotation of the shutter elements 40. Obviously the shutters could also be configured in many other ways, including electronic shutters of various sorts e.g. PLZT, colloidal or electrophoretic cells, since the switching speed of these cells can be slow.

Figure 1:
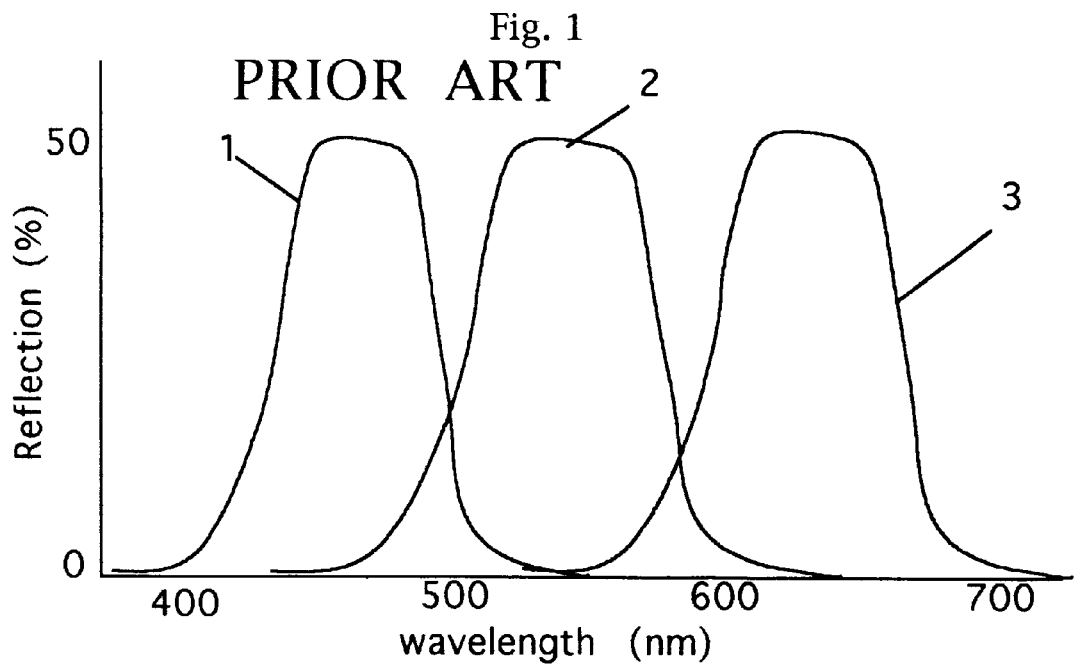
FIG. 1 illustrates the spectral reflectance of three coextensive CLC filter/mirrors (1, 2 and 3).
Figure 2:
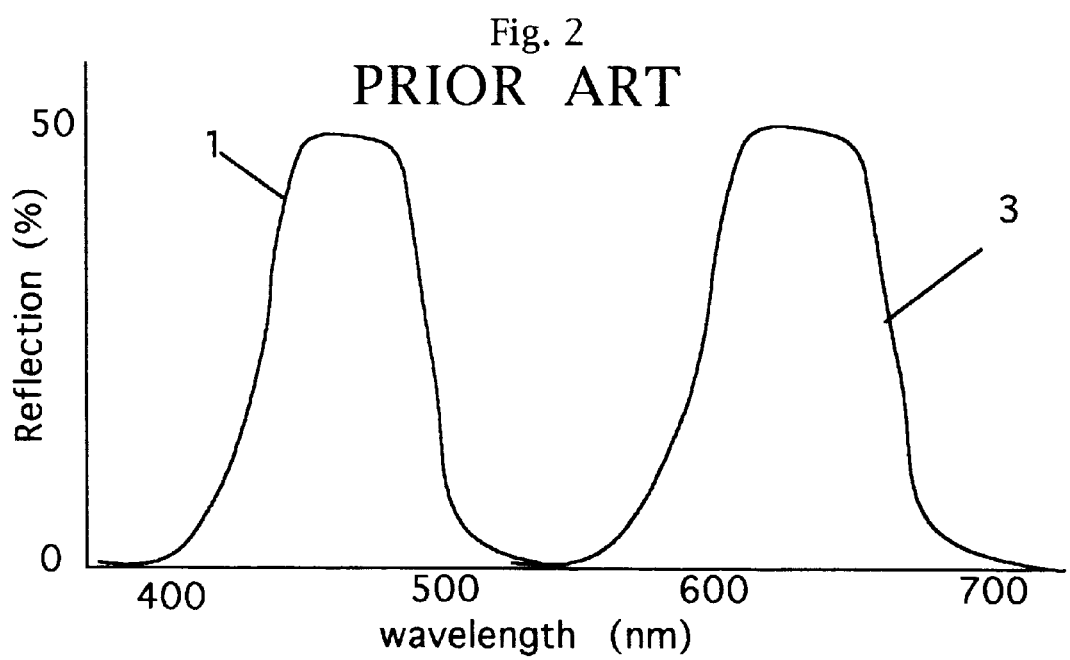
FIG. 2 illustrates the spectral reflectance of two coextensive CLC filter/mirrors (1 and 3).
Figure 3:
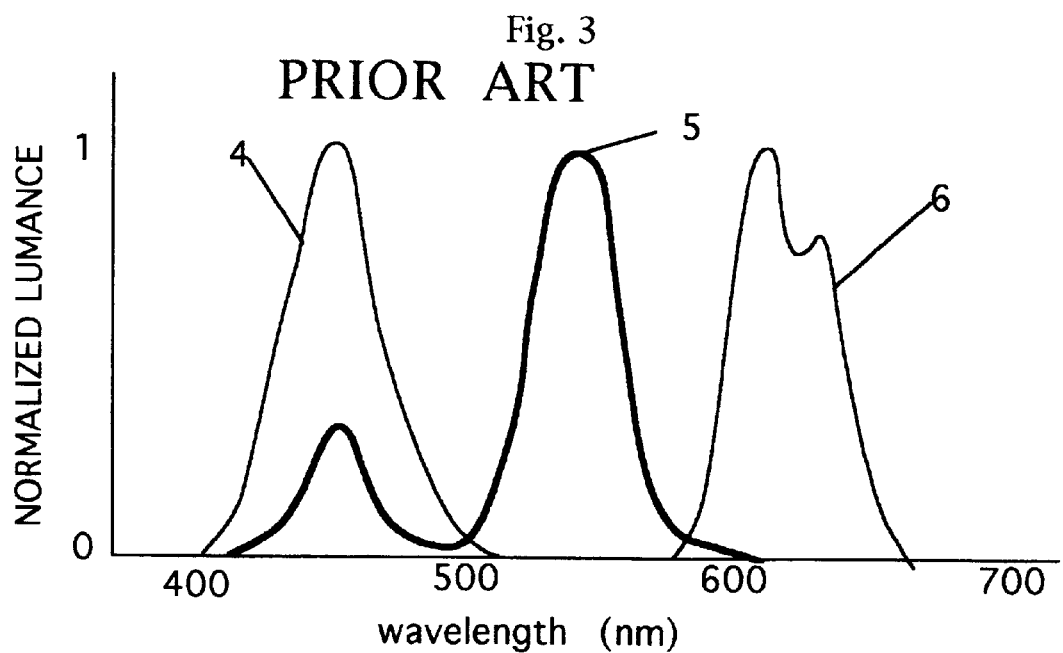
FIG. 3 illustrates the spectral distribution of three phosphors (4, 5 and 6) of a fluorescent light source.
Figure 4:
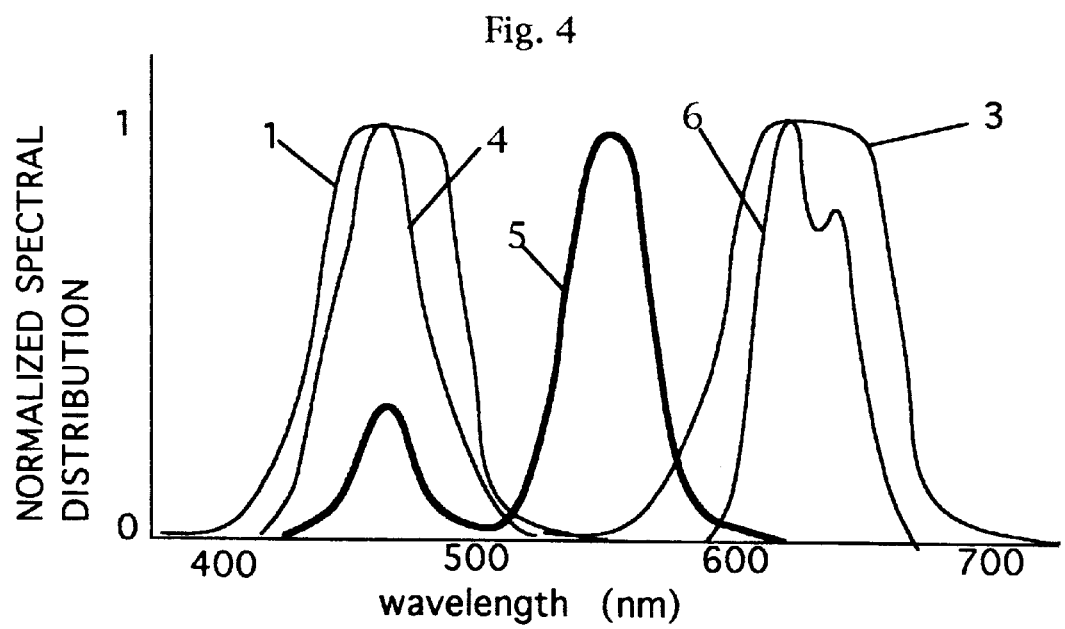
FIG. 4 illustrates the superposition of the spectral distributions of FIG. 2 and FIG. 3, wherein one color is transmitted and two colors are reflected by the CLC mirrors.
Figure 20:
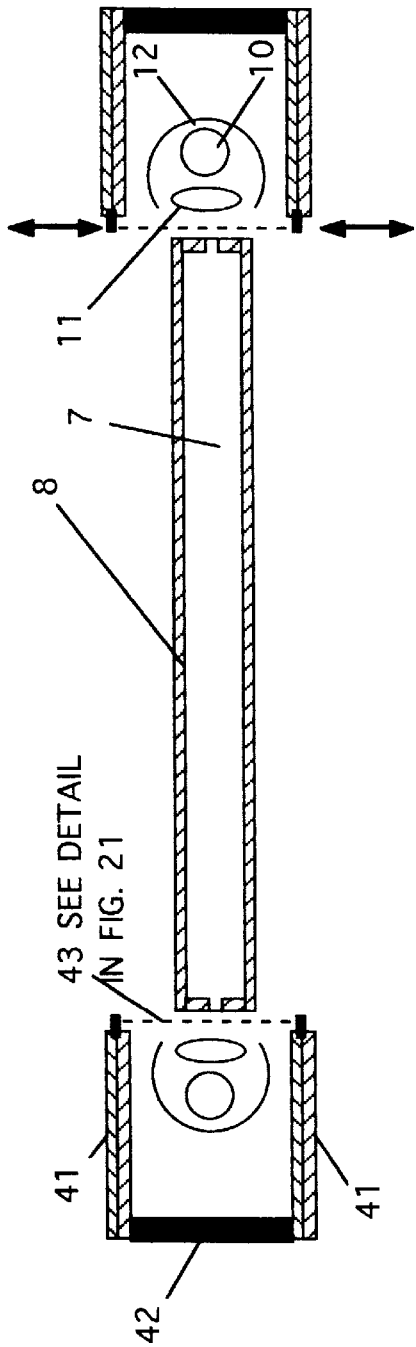
FIG. 20 illustrates a lighted sign, wherein changes of the display can be mode.
Figure 21:
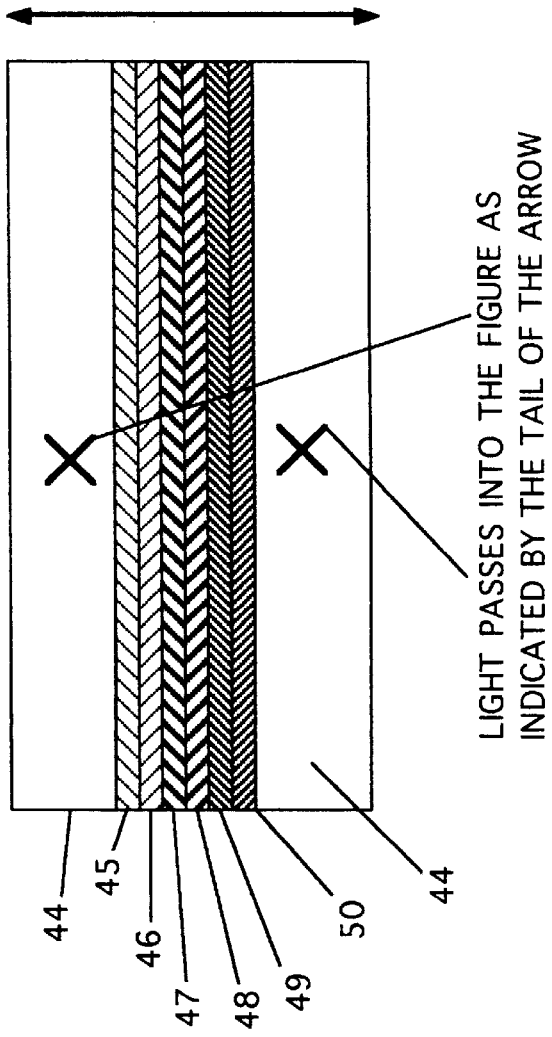
FIG. 21 illustrates the detail of the switching elements of the sign of FIG. 20.

Moving or changing displays can also be created by controlling the color and polarization of the light injected into the medium. In doing this the colors of the display are limited to the primary colors, The simplest of these devices is illustrated in FIG. 20, where piezoelectric actuator elements 41 are attached at one end to a support 42 and having the other end of the actuator 41 move a polarization and color coded CLC filter/mirror 43 at the injection port(s) 13 of a light pipe. The CLC filter/mirror pictorially encoded coatings 8 are deposited upon the transparent non-birefringent medium 7, as described in earlier embodiments. In this way only light of selected color and polarization are injected into the light pipe. The details of the CLC filter/mirror element selection are illustrated in FIG. 21. The filter is comprised of a non-encoded support area 44 and six CLC filter/mirror areas 45, 46, 47, 48, 49 & 50. The reflective characteristics of the CLC filter/mirror areas 45 through 50 is the combination of the colors of FIG. 1 in one handedness of CPL and the colors of FIG. 2 in the other handedness of CPL. This allows one handedness in one color to be transmitted by the CLC filter/mirror segment 45 through 50.

In FIG. 21, the selection element is viewed from the perspective of the light source, such that the light from the source passes through the page. In some applications, it may be desirable to blank the display, by shifting an opaque support areas 44 over the light injection port 13. In this illustration three of the filter/mirror areas transmit color light of one handedness and the remaining three areas transmit color light of the orthogonal handedness, the selection of which can be controlled by the drivers for the piezoelectric actuators 41. The actuator 41 can assume and hold a position for any desired filter/mirror element (45–50). This can be done rapidly enough to satisfy "motion sign" conditions. In operation, the CLC filter/mirror selection element of FIG. 21, color and polarization encode light to be injected into the light pipe of the sign. Then only the pictorial representation 8 on the sign faces, not encoded with CLC filter/mirror material reflecting the specific color and handedness of encoded light is displayed. When a second, third, etc. color and polarization selection is made by the CLC filter/mirror elements (45–50), other pictorial representations are displayed, so that changes of the picture, message or apparent motion of the display figures is achieved.

Aside from advertising signs, applications for the devices of FIG. 20, as well as the device of FIG. 17, include "status" and "condition" indicators for a large number of applications. These applications range from auto, aircraft and appliance instrumentation to "instructional" signs, such as the familiar "walk/wait" signs at street crossings. A single "indicator" sign of the invention can perform the function of six or more conventional indicator signs. This ability makes these signs suitable in applications where the area available for display is at a minimum or the operator finds too many displays impossible to adequately monitor. Compressing the displays into a single display module, helps alleviate these problems, without compromising other displays.

Figure 22A:
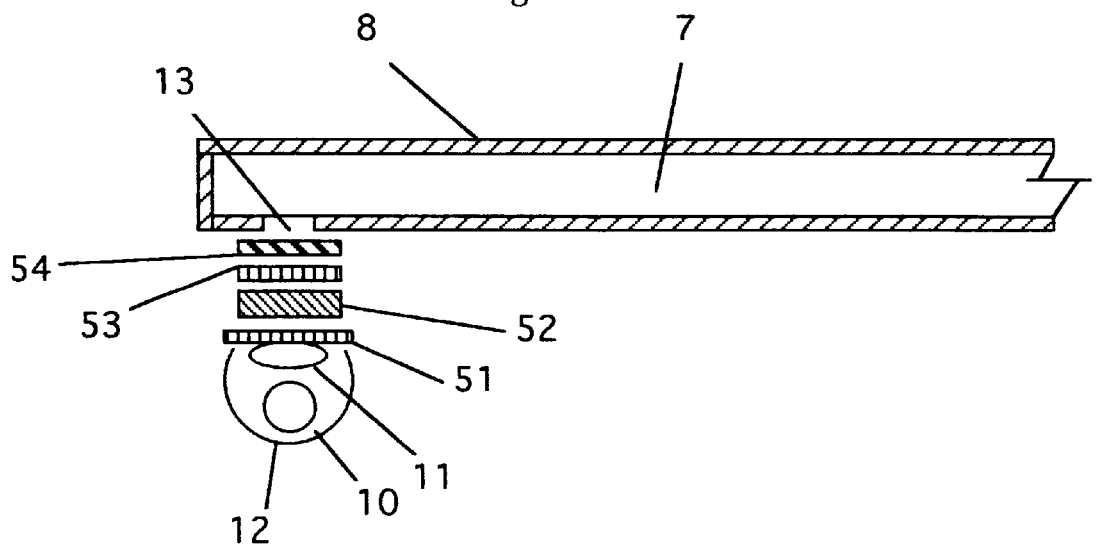
FIG. 22a, 22b and 22c illustrate additional methods of switching the display of the sign illustrated in FIG. 20.
Figure 22B:
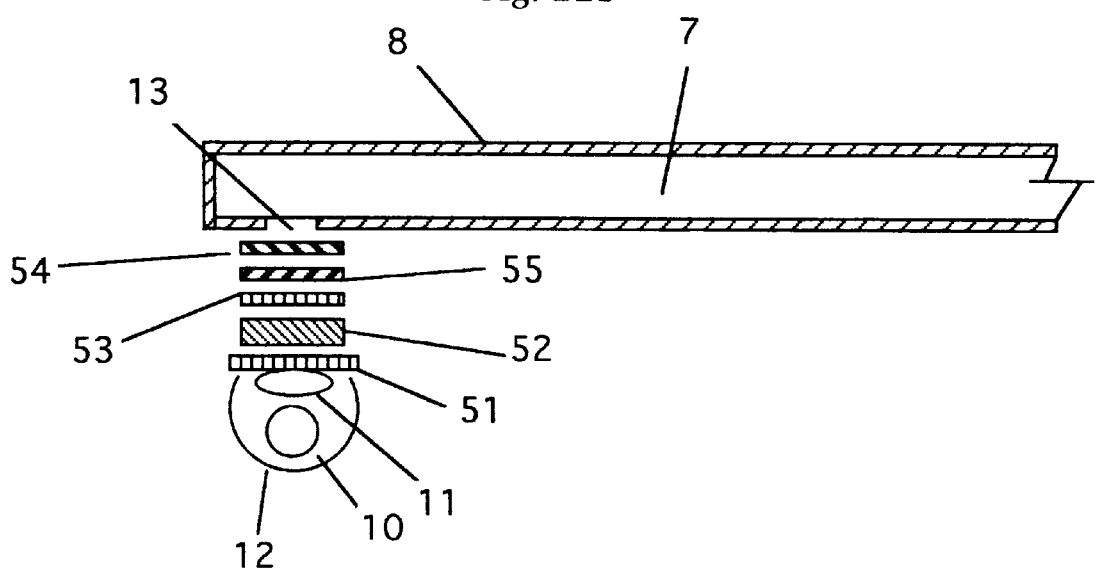
Figure 22C:
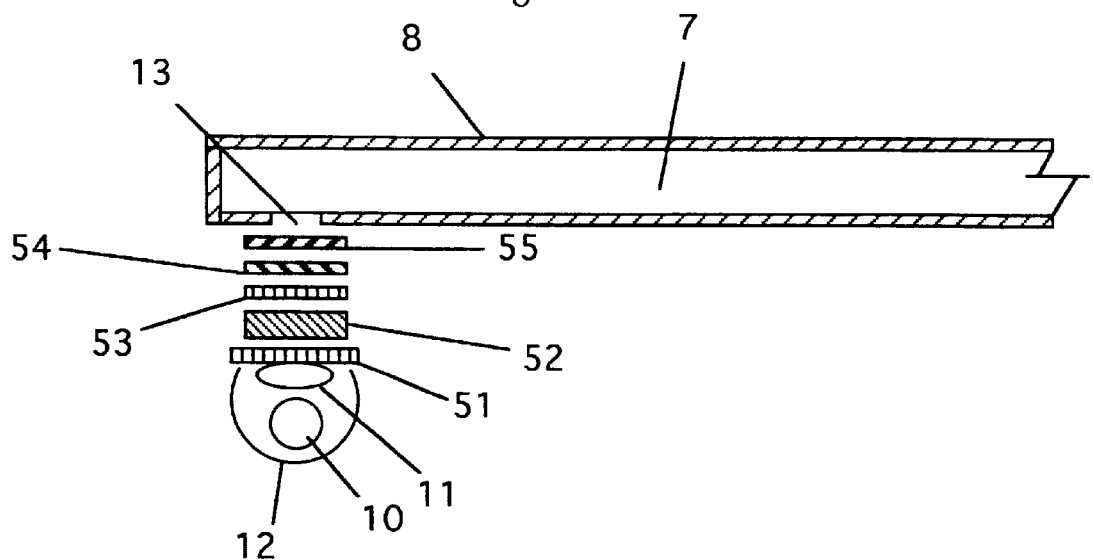

Other means of color and polarization encoding the input light of these displays are illustrated in FIGS. 22. These systems are all electronic in nature and while considerably more expensive, they have the advantage of being able to switch the color and polarization encoding rapidly enough to produce the effect of continuous motion and possibly even sufficiently fast to blend the colors of the display, producing a "black and white" apparently continuous motion display. However, switching more slowly, so as not to lose the multi-color effect is advantageous in most advertising. The multi-color effect, more effectively draws one's attention to the display. Illustrated in FIG. 22a is a color and polarization encoding light system, following the teachings of Conner, U.S. Pat. Nos. 4,966,441; 4,917,465; 5,050,965 & 5,124, 818. Conner teaches of passing linearly Polarizing Light (LPL), which is the function of element 51, into a variable retarding LC cell 52. The retardation of the cell 52, is directly proportional to the birefringence and thickness of the cell and inversely proportional to the wavelength of light being passed through the cell. Thus, by making the cell 52 highly birefringent and very thick, a dispersion of retardation is obtained with respect to the wavelength of the light passed through the cell 52. When LPL is passed through the cell 52 with the plane of polarization oriented at 45° to the optical axes of the retarder, then the plane of polarization for the different colors of light become rotated different amounts. The plane of linear polarization for the various colors of light are rotated relative to each other. Further, by varying the retardation of the cell 52 the plane of polarization for any color can be rotated to align with the orientation of LPL, transmitted by the linear polarizer 53, located at the exit of the cell 52. In doing this, any color of light can be transmitted into the display. In the case at hand, the display requires CPL, rather than the LPL produced by this arrangement, but the LPL is easily converted to CPL by aligning the plane of polarization of the LPL at 45° to the optic axes of a quarter wave plate 54, which passes CPL into the injection port 13. This then allows any color of CPL of one handedness to be injected into the light pipe medium 7 of the CLC display. However, to have CPL of both handednesses, injected into the light pipe medium 7, an additional control element 55 must be added, as shown in FIG. 22b. This element 55 is also a variable retarder, as taught by Bos, U.S. Pat. No. 4,566,758 or a twisted LC structure (commonly used in LCDs), which will rotate the plane of linear polarization relative to the quarter wave plate 54 through +45° and −45° relative to an optical axis of the wave plate. Or as illustrated in FIG. 22c, a half wave variable retarding structure 55, can be located after the quarter wave plate 54. In this case the variable retarder 55, switches from having no retardation to a half wave retarder and in so doing converts the CPL from one handedness of CPL to the orthogonal handedness.

Figure 23:
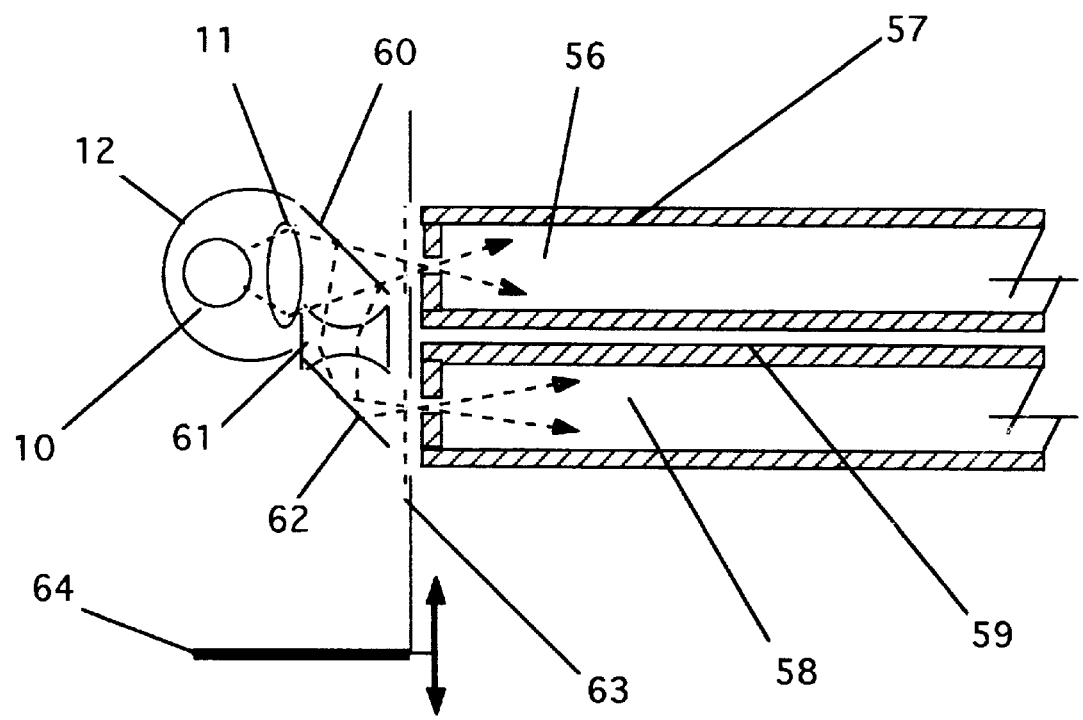
FIG. 23 illustrates the method of multiple sign or artwork displays.

The final embodiments of the invention concern the use of the light pipes in the rendering of art. It is obvious that pictures could be presented with the methods described for the lighted signs of this invention, but additional methods of rendering art are also possible. Using the methods taught by Hall et al, U.S. Pat. No. 5,398,131, it is possible to produce photographic or near photographic quality pictures, upon most media, using CLC inks or dyes of one or both handednesses. It is also possible and generally more practical to convert photographic renderings into a dot matrix of the color fields to render the proper half-tone color shades. This can then be reproduced upon a suitable transparent, non-birefringent medium, using three color fields of CLC inks, much as is done for the color printing of pictures. Greater resolution is possible when using the CLC inks, as is taught by Hall et al, because the color dots (actually the lack of color dots, in this case) can be printed in a superimposed manner, whereas in conventional printing, the specific color dots must be spatially separated. This achieves a much higher resolution image, when CLC inks are used in this way. It is also possible to do art renderings with images deposited upon a suitable medium by silk-screen methods, for the purposes of creating artful reproductions. When pictures are so rendered with CLC inks of both handednesses, it is possible to change the picture or a portion of the picture being viewed by a change of the polarization of the light injected into the light pipe by the methods of the earlier embodiments of the invention. It is also possible to create pictures with multiple planes of depth and view the individual planes of the image(s) either together or separately by the methods illustrated in FIG. 23. Pictures can be made wherein the rear picture is viewed through the features of the front picture establishing an ethereal effect. Additionally, certain features of the front picture can be printed with CLC ink fields of the handedness to block the light from the rear picture. When this is done, the viewer can look around the features of the front picture to see detail of the rear picture, yielding a true 3 D effect. In this instance, when the front picture is turned "off", those portions of the front picture masking the rear picture, will continue to block the light from the rear picture. But by printing the two pictures with different handedness inks, one picture does not affect the other picture and each picture can be viewed individually or together. The method could become popular for group or family portraits, creating a new product for photographers. It might also be noted that lighted pictures of this type, can serve as "night lights" in the home. In FIG. 23, the elements 10, 11 & 12 of the light source are shown injecting light into an upper medium 56, coated with CLC filter/mirrors 57, reflecting one handedness of CPL The pictorial information of one picture is encoded in the CLC filter/mirror layers 57 as described earlier. CPL is also injected into a second medium 58, coated with CLC filter/mirror layers 59 reflecting CPL of a handedness orthogonal to said one handedness and the pictorial information of the second picture is similarly encoded in the CLC filter/mirror layers. In this illustration the polarization separation of the two handednesses of CPL is achieved by the reflection of CPL of a handedness orthogonal to said one handedness, out of the light beam by an inclined CLC filter/mirror 60. While the unreflected CPL passes undisturbed into the medium of the first picture. The reflected light passes through re-converging optics 61, so that it will form a minimum waist at the point of entry to the second medium 58, where it will produce the image of the second picture. After the reconverging optics 61 the light encounters a second inclined CLC filter/mirror 62, reflecting the same handedness of CPL as the first inclined CLC filter/mirror 60. Thus, the light is directed into the medium 58. In passing the light of the two pictures 57 & 59 into the media 56 & 58, the illustration shows the light proceeding through apertures of a shutter 63, which is attached to a selection mechanism 64. By a process of selecting or changing the apertures through which the CPL can pass or be blocked, one selects to view either picture individually or both pictures together.

These and other embodiments can be practiced without departing from the true scope and spirit of the invention, which is defined by the following claims.

What is claimed is:

1. An illuminated display comprising:
    a first non-birefringent transparent medium having a first main surface and a port allowing injection of light into said medium,
    a light source for injecting light of a first specific color and polarization orientation into the medium through the port, and
    a first chiral liquid crystal (CLC) filter/mirror structure on said main surface of the medium, said first CLC structure including a first CLC filter/mirror layer reflecting light of said first specific color and polarization orientation, said first CLC filter/mirror layer having at least one aperture providing a first display element, whereby light of said fist specific color and polarization orientation when injected into said non-birefringent transparent medium is passed through said first display element to a viewer.

2. An illuminated display according to claim 1, wherein the CLC filter/mirror structure includes a second CLC filter/mirror layer which is superimposed on said first CLC filter/mirror layer and reflects light of a second specific color or polarization orientation, said second CLC filter/mirror layer having at least one aperture providing a second display element, whereby light of said second specific color or polarization orientation when injected into said non-birefringent transparent medium is passed through said second display element to a viewer.

3. An illuminated display according to claim 1, wherein the non-birefringent transparent medium has a second main surface and the illuminated display further comprises a second CLC filter/mirror structure on said second main surface of the medium, said second CLC structure including a second CLC filter/mirror layer reflecting light of a specific color and polarization orientation, said second CLC filter/mirror layer having at least one aperture providing a second display element, whereby light of said specific color and polarization orientation reflected by the second CLC filter/mirror layer when injected into said non-birefringent transparent medium is passed through said second display element to a viewer.

* * * * *